Feb. 13, 1940. W. A. HART 2,189,984
BROACHING MACHINE
Filed Sept. 8, 1936 2 Sheets-Sheet 2
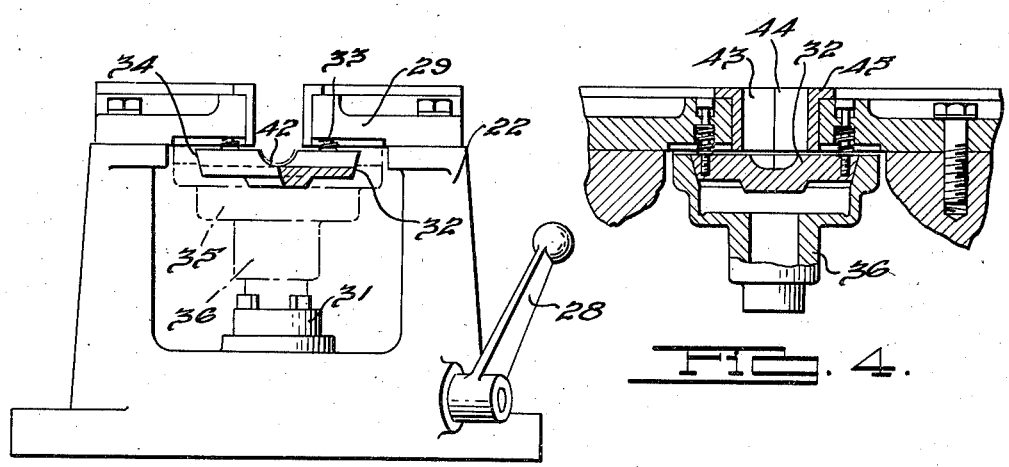
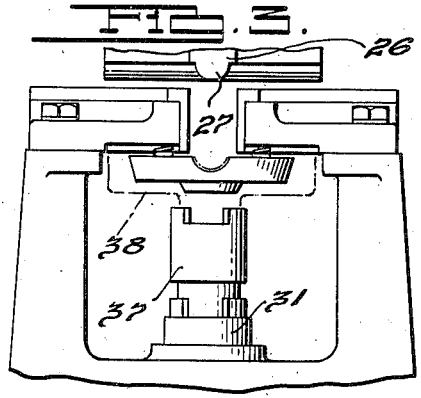
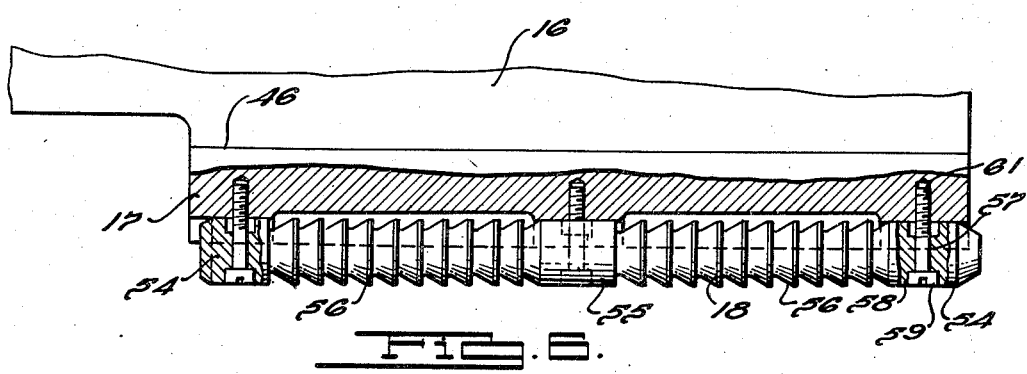
INVENTOR
William A. Hart.
BY
Harness, Dickey, Pierce & Hann.
ATTORNEYS.

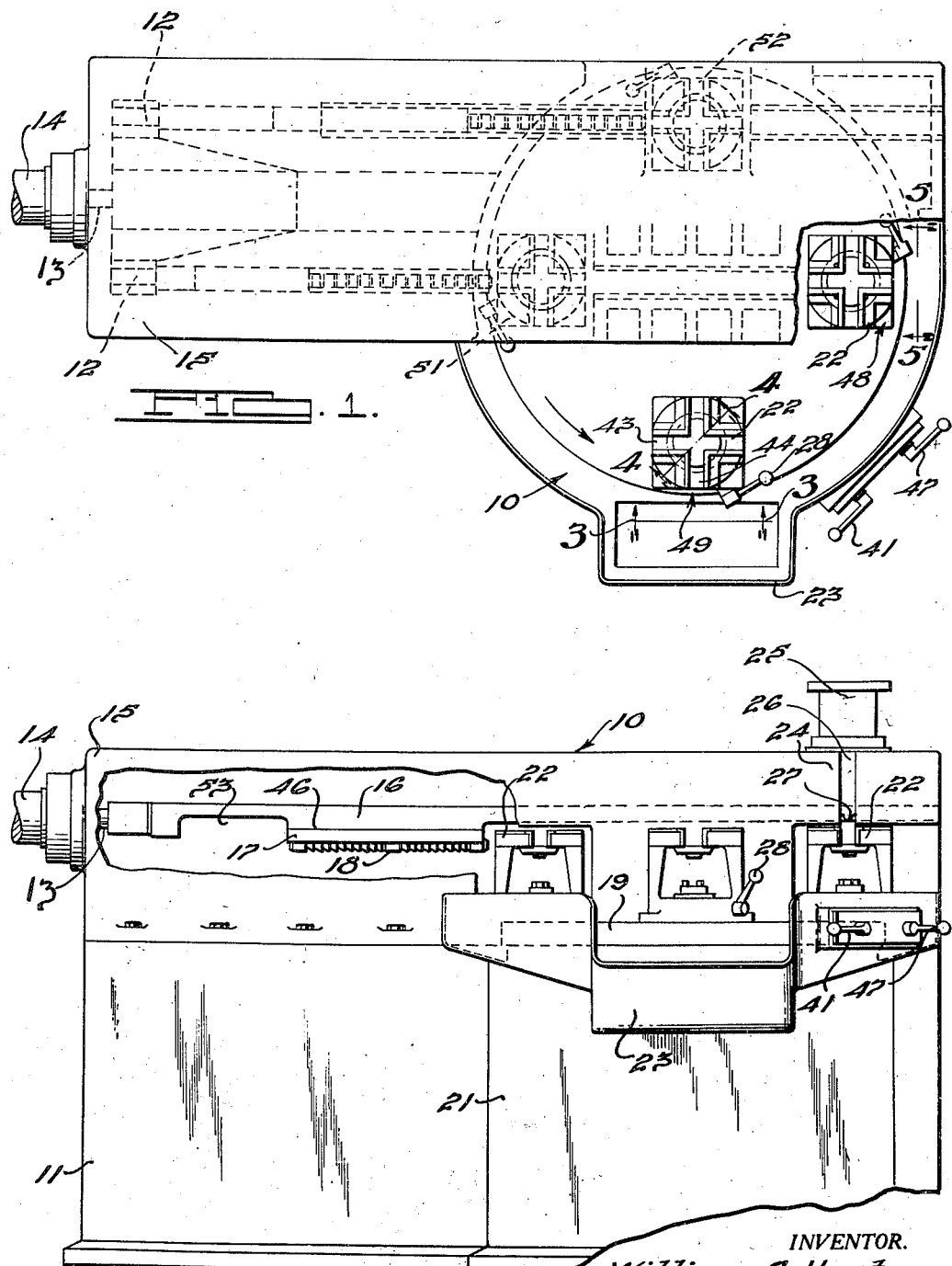

Patented Feb. 13, 1940

2,189,984

UNITED STATES PATENT OFFICE 2,189,984

BROACHING MACHINE

William A. Hart, Detroit, Mich., assignor to Colonial Broach Company, a corporation of Michigan Application September 8, 1936, Serial No. 99,737

11 Claims. (Cl. 90—33)

My invention relates to broach machines and methods, and particularly to a broaching machine of the multiple station type which progressively machines a work piece as it is advanced from station to station.

Broaching operations have been utilized heretofore to machine apertures for receiving bearings or bearing shells by operating on each half of the work piece. The broach was of semi-circular form having a plurality of teeth of progressively increasing size. The broach was pulled across the work piece as it was clamped to have the aperture to be machined positioned relative to the path of movement of the broach.

In practicing my present invention, I employ a rotatable table having a plurality of stations thereon, each of which has been constructed to receive and clamp a work piece. The table is advanced a predetermined number of degrees at each step and the broach operated in one direction or another at each advancement. The work piece herein to be described is a housing for a universal joint which has four apertures disposed 90 degrees to each other. The housing comprises two castings in which one half of the four apertures are disposed. Each casting constitutes a work piece which is mounted on the table and disposed opposite to a pair of spaced broaches which are moved in unison. The first work piece to be worked upon by the first broach is advanced out of the path of movement of the broach to permit the broach to be returned to initial position, after which the work piece is advanced to the second broaching stage adjacent to the path of movement of the second broach. A second work piece is moved during this last movement into the path of movement of the first broach. The two broaches are then moved to machine the first pair of apertures in the second work piece and the second pair of apertures in the first work piece. After the broaches have passed completely through the work pieces, the table is turned to have the work pieces moved out of the path of movement of the broaches so that the broaches may be returned to their initial positions. The table is then advanced to move additional work pieces adjacent to the broaches and the finished work piece to an unloading position. After a work piece is unloaded and the table again advanced, the clamping fixture moves to a loading position where a new work piece is positioned and secured prior to being advanced into the path of the broaches.

The broaches are preferably made round even though they machine only a semi-circular aperture. Bearings are provided on the broach by which they are secured to a reciprocal support. The securing means permits the broach to be removed, turned 180 degrees and reclamped in position to have the other half of the teeth outwardly presenting in a position to effect the broaching operation. The broach may be machined and sharpened as any circular broach and will have twice the life in view of the fact that only one half is employed at a time.

When a plurality of machines are employed, like fixtures may be mounted on each individual machine to receive and support one half of the universal joint housing. When a single machine is utilized, half of the clamping fixtures support one portion of the housing, while the other half support the other portion.

Accordingly, the main objects of my invention are: to provide a broaching machine for broaching work pieces in a progressive manner; to provide a machine for broaching an aperture in the face of one work piece while a second broach is broaching an aperture in a work piece at an angle to the aperture initially broached therein by the first said broach; to provide a machine for broaching and finishing apertures in work pieces through the progressive movement of the pieces into and from the path of movement of the broaches; to pass a pair of broaches across adjacent work pieces and after said passage to advance the work pieces out of the path of movement of the broaches to permit the broaches to be returned to their initial positions; to provide loading and unloading stations on the machine to permit the insertion and removal of work pieces during the broaching operations; and, in general, to provide a machine for broaching work pieces, which is positive in operation, simple in construction, and economical of manufacture.

Other objects and features of novelty of my invention will be either specifically pointed out or will become apparent when referring, for a better understanding of my invention, to the following description taken in conjunction with the accompanying drawings, wherein:

Figure 1 is a plan view of a broaching machine embodying features of my invention;

Figure 2 is a view in elevation, with parts broken away, of the machine illustrated in Figure 1;

Figure 3 is an enlarged broken view of structure illustrated in Figure 1, taken on the line 3—3 thereof;

Figure 4 is an enlarged sectional view of structure illustrated in Figure 1, taken on the line 4—4 thereof;

Figure 5 is an enlarged broken view of structure illustrated in Figure 1 as viewed from the lines 5—5 thereof, and Figure 6 is an enlarged view, partly in section, of a portion of the structure illustrated in Figure 2.

Referring to Figures 1 and 2, the machine 10 embodies a base 11 supporting a head 12 for movement in reciprocation. The head is driven by a piston rod 13 which operated in a cylinder 14 mounted on one end of a housing 15. The piston in the cylinder is connected to the rod 13 and through the control of the passage of oil into either end of the cylinder, the head 12 is reciprocated. The head is supported in the housing 15 on suitable ways in a manner well known in the art. The head has slides 16 mounted on each of its ends which have an extending portion 17 on which a broach 18 is secured. A table 19 is mounted for reciprocation on an arcuate projection 21 of the base 11. The table is herein illustrated as being provided with four clamping fixtures 22 for receiving and clamping the work piece. The projecting portion of the base 21 is provided with work receiving troughs 23 in which the work before and after the broaching operation may be disposed. A locating head 24 is mounted adjacent to the loading position to accurately postion the work piece in the fixture before it is clamped therein. A cylinder 25 operates slides 26 which are provided with projecting ends 27 which engage the roughed out apertures in the work piece. After the work piece has been so loaded, the handle 28 of the fixture is operated to tightly clamp the work in position.

In Figure 3 I have illustrated a fixture 22 as embodying a head 29 and a plunger 31, which plunger is actuated by the handle 28. The head carries a plate 32 which is resiliently mounted by springs 33 and provided with outer truncated spherical surface 24 which engages a similar surface on the interior of the work piece 35. The work piece herein illustrated is one half of a universal joint housing which has apertures extending therethrough at right angles to each other. The fixture herein illustrated is that for operating on the one half portion of the housing having a long shank 36. A similar fixture is illustrated in Fig. 5 in which an adapter 37 is employed to extend the length of the plunger 31 to operate on and clamp a work piece 38 which is similar to the work piece 35 with the exception that the extension 36 is omitted therefrom. It is to be understood that the adapter may be omitted and the plunger 31 lengthened or the height of the fixtures decreased.

In Figure 4, I have illustrated the clamped position of the plate 32 and the work element 36. Before the work piece is clamped in the fixture, the cylinder 25 is energized. This occurs when a control lever 41, illustrated in Figure 1, is operated to produce the movement of the broaches through a cutting cycle. The flow of fluid in the cylinder 25 causes the slides 26 to move downwardly to have their ends engage the roughed out apertures 42 in the work piece. This accurately aligns the work piece in the fixture and the handle may then be moved to cause the plunger 31 to move upwardly to clamp the work piece in position. The head 29 of the fixture has track portions 43 and 44 therein which cross at right angles and which provide guideways upon which the broaches are movable. At either side of the fixture when at a broaching station track portions 45 are provided aligned with the portions 43 and 44 and in engagement with shoulders 46 provided on the extending portion 17 of the slide 16.

In operation a work piece is placed in the clamping fixture 22 and the operating handle 41 is actuated to cause the broaches to be actuated through a broaching operation to a position on the right-hand side of the machine as viewed in Figure 1. At the same time the cylinder 25 is actuated to cause the slide 26 to move downwardly to position the work in the fixture, in which position it is clamped through the operation of the handle 28. The handle 47 is then operated to retrieve the plunger in the cylinder 25 and to actuate means (not shown) to cause the table to be turned 45 degrees. This moves the fixtures from the path of movement of the broaches which may then be returned to their initial position illustrated in Figure 1. Thereafter, the table is rotated another 45 degrees to advance the fixture with a new work piece into a position to be machined in the path of movement of the first broach. Such advancement moves the fixture with a new work piece under the clamping head where a plunger 26 moves downwardly to position the work piece while the broaches are moved through the cutting portion of their cycle of movement. Thereafter, the table is turned 45° to move the fixtures out of the path of the broaches which are then returned to initial position, that illustrated in the drawings.

In this manner, progressive broaching operations are accomplished, the one broach operating when the work piece is at one station for accurately machining one aperture, and due to the turning of the table to advance the work piece into the path of movement of the second broach, the said machined aperture will be disposed at 90° to such path. The next movement of the broaches will machine the second aperture at 90° to the one machined by the first said broach. It is to be understood that at the end of each broaching operation the table is moved 45° to move the fixtures out of the path of movement of the broaches so that they may be returned to initial position before the table is again turned 45° to advance the fixtures relative to such paths of movement.

The loading and unloading station has been indicated by numeral 49 in Figure 1, while the work positioning and clamping station has been indicated by numeral 48. Numeral 51 indicates the station at which the second aperture is broached while numeral 52 indicates the station at which the first aperture is machined.

Operating handles 41 and 47 are illustrated for controlling the operations. Upon initial movement of the handle 41, the broaches 18 are advanced across the work pieces and fluid is delivered to the cylinder 25, which causes the plunger 26 to position the work piece. At the end of the stroke, after the broaches have advanced through the work pieces, a valve or other means is operated to stop the advancement of the ram 14 and retract the plunger 26. Thereafter the operating handle 47 is actuated to advance the table 45° which advancement operates control means to retract the ram 14 and the broaches to the initial position.

It is to be understood that the operation may be entirely automatic whereby upon the starting of the machine the table will rotate through 45° stages and the broaches will reciprocate in synchronism with the operation of the table so that it is only necessary to remove and insert work pieces at station 49 and to clamp the work piece at the station 48 to produce the machine operations. Such a control means are well within the knowledge of one skilled in the art and are not shown in detail.

During the broaching operation the broach is accurately supported relative to the fixture by the guides 43 and 44 which engage the support 17 and accurately positions the broach relative to the work piece. The broach support is provided with cutout portions 53 at the rear of the broaches to permit the movement of the fixtures 22 out of the path of movement of the broaches after a cutting operation when the table is rotated 45°.

In Figure 6, I have illustrated the broach 18 as being provided with bearing portions 54 and 55 between which a plurality of teeth 56 of conventional form are provided. The broach is circular in form and is supported to have only one side of the teeth available to machine an aperture, thus doubling the life of the broach. The bearings 54 and 55 are provided with apertures 57 which are shouldered at each end at 58 to receive the heads 59 of screws 61 which secure the broach to the support 17. When the teeth have become dulled through use, it is only necessary to remove the screws and re-insert them in the apertures from the opposite side and secure the broach to the support 17 to present the opposite sides of the teeth to the work. In this manner, the life of the broach is doubled and the construction of the broach is cheapened, since the circular type of broach is easily manufactured. After the opposite side of the teeth becomes dull from use, the broach can then be removed and sharpened as any circular broach by a very simple sharpening operation.

While I have described and illustrated but a single embodiment of my invention, it will be apparent to those skilled in the art that various changes, omissions, additions, and substitutions may be made therein without departing from the spirit and scope of my invention as set forth in the accompanying claims.

I claim as my invention:

1. A broaching machine including, in combination, a base, a rotatable table on said base, fixtures on said table for supporting and clamping work pieces, a reciprocable element on said base, a pair of broaches operated by said element, means for advancing two fixtures into the paths of movement of said broaches, means for advancing said broaches through the work pieces on the two fixtures in the paths thereof, and means thereafter for advancing said work pieces out of said path to permit the return of the broaches to their initial positions, said advancement moving one of the fixtures toward the path of one of the broaches.

2. A broaching machine including, in combination, a base, a rotatable table on said base, fixtures on said table for supporting and clamping work pieces, a reciprocable element on said base, a pair of broaches operated by said element, and means for supporting said broaches below the tops of said elements and fixtures, leaving the front and rear ends free to provide clearance for the movement of the fixtures to and from the broaches' paths at either end of the broaches.

3. A broaching machine including, in combination, a base, a rotatable table on said base, fixtures on said table for supporting and clamping work pieces, a reciprocable element on said base, a pair of broaches operated through a cutting stroke by said element during one half cycle of movement, and guides on said fixtures engaged by said element during a broaching operation for accurately positioning the broach relative thereto and to the work pieces.

4. A broaching machine including, in combination, a base, a rotatable table on said base, fixtures on said table for supporting and clamping work pieces, a reciprocable element on said base, a pair of broaches operated through a cutting stroke by said element during one half cycle of movement, means for positioning the work elements relative to the fixtures before the clamping thereof, and guide means on said fixtures engageable by said element for relatively positioning said broaches and work pieces during the broaching operations.

5. A broaching machine for machining grooves in a work piece including, in combination, a base, a rotatable table on said base, fixtures on said table for supporting and clamping work pieces, a reciprocable element on said base, a pair of broaches operated by said element, means for advancing said table in uniform steps to move the fixtures laterally across the paths of the broaches, means for advancing the broaches through a cutting operation after one step which moves the fixtures into the broaching paths, and means for retrieving the broaches after the subsequent step of moving the fixtures from said paths.

6. A broaching machine including, in combination, a base, a rotatable table on said base, fixtures on said table for supporting and clamping work pieces, a reciprocable element on said base, a pair of broaches carried by said element one in advance of the other, a device for positioning and clamping the work pieces relative to said fixtures, means for advancing said broaches through a cutting operation for machining two work pieces while a third is being positioned in a fixture by said device, means for moving said fixtures out of the broaches' paths of movement and away from said device, said advancing means retrieving said broaches thereafter, and means for moving fixtures into the broaches' paths and adjacent to said device.

7. A broaching machine including, in combination, a base, a rotatable table on said base, a fixture on said table for supporting and clamping a work piece, a reciprocable element on said base, a pair of broaches operated by said element, guide means carried by said element, and means on said fixture engageable by said guide means for relatively positioning said broach and work piece during a broaching operation.

8. A broaching machine including, in combination, a base, a rotatable table on said base, a fixture on said table for supporting and clamping a work piece, an element on said base positioned below the top of said fixture, a broach carried by said element mounted below the top of said fixture, and a recess provided in said element to permit the fixture to pass across the path of the broach at either of its ends.

9. A broaching machine including, in combination, a base, a rotatable table on said base, a fixture on said table for supporting and clamping a work piece, an element on said base positioned below the top of said fixture, a broach carried by said element mounted below the top of said fixture, a recess provided in said element to permit the fixture to pass across the path of the broach at either of its ends, and guide means on said fixture engageable by said element for positioning the fixture relative thereto during a broaching operation.

10. A broaching machine including, in combination, a base, a rotatable table on said base, four fixtures disposed adjacent to the periphery of the table ninety degrees from each other, a pair of broaches, one having a path of movement on the diameter of the table, the other on a cord thereof, supports for said broaches, means for simultaneously moving said broaches and supports in said paths by a common moving means with one broach disposed in advance of the other for progressively machining workpieces as they are advanced to the paths of the broaches.

11. A broaching machine including, in combination, a base, a rotatable table on said base, four fixtures disposed adjacent to the periphery of the table ninety degrees from each other, a pair of broaches, one having a path of movement on the diameter of the table, the other on a cord thereof, supports for said broaches, means for simultaneously moving said broaches and supports in said paths by a common moving means with one broach disposed in advance of the other for progressively machining workpieces as they are advanced to the paths of the broaches, the supports for said broaches being so constructed as to permit the fixtures to pass across the paths of the broaches at either of their ends.

WILLIAM A. HART.